April 16, 1940.  H. H. REYNOLDS  2,197,157
TRAILER HITCH
Filed July 18, 1939  2 Sheets-Sheet 2
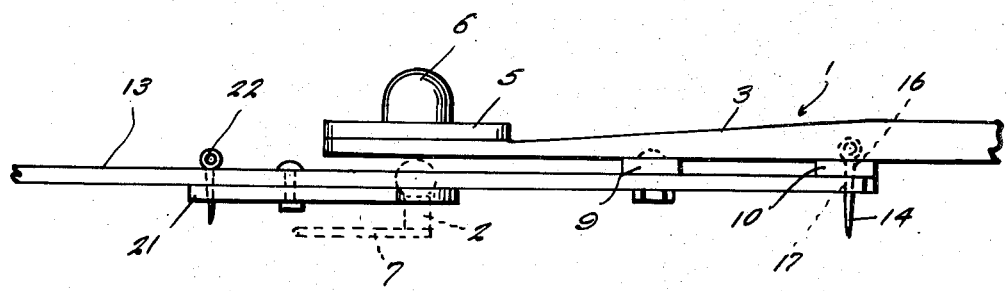
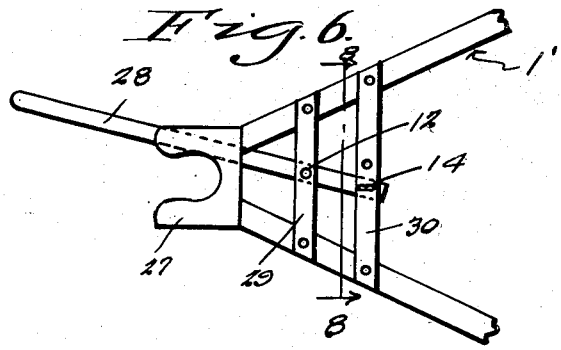
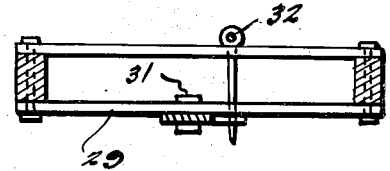
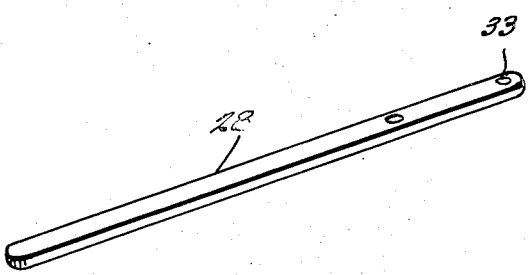
Inventor
H. H. Reynolds
By Clarence A. O'Brien
and Hyman Berman
Attorneys Patented Apr. 16, 1940

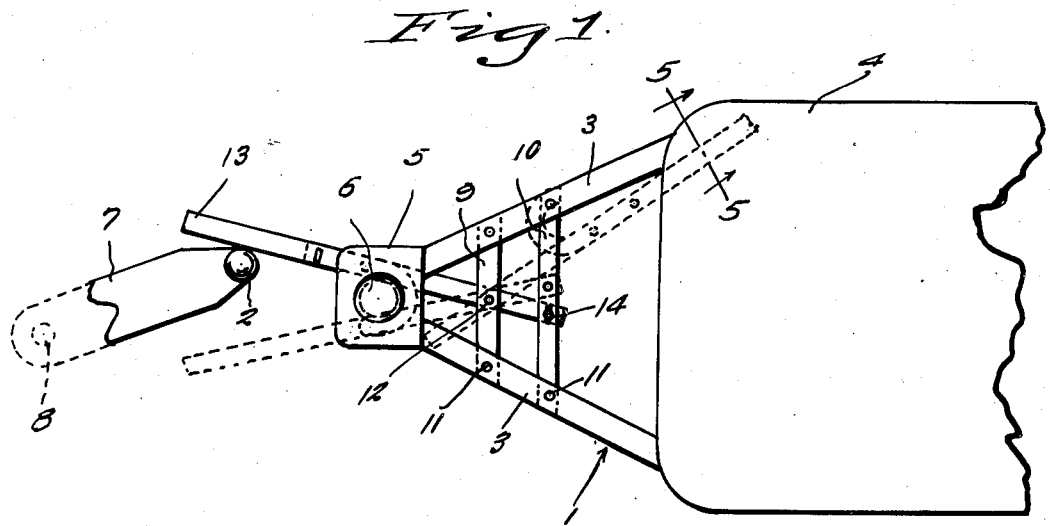
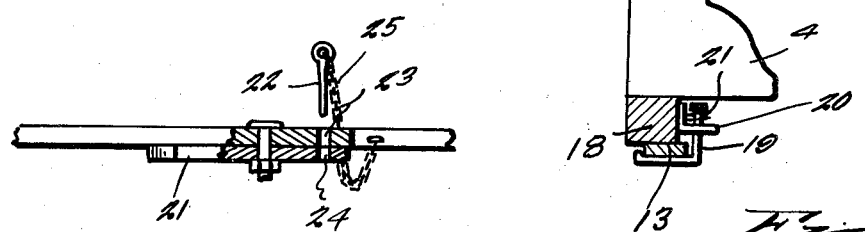
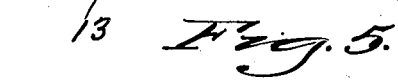
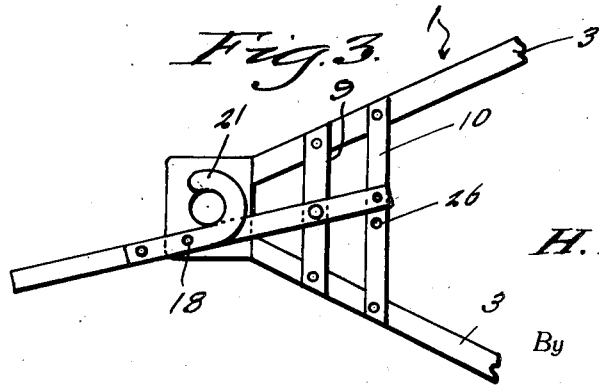
Inventor
H. H. Reynolds

2,197,157

UNITED STATES PATENT OFFICE 2,197,157

TRAILER HITCH

Henry Howard Reynolds, Pontiac, Mich.

Application July 18, 1939, Serial No. 285,143

5 Claims. (Cl. 280—33.17)

My invention relates to improvements in trailer hitches and more particularly to aligning means therefor.

By way of explanation, in a commonly used type of trailer hitch, the trailer is provided with a forwardly extending draft rigging terminating in an inverted socket member for coupling downwardly onto a ball member swingably mounted on the tow car for lateral positioning relative to the socket member. This type of trailer hitch is very difficult to couple together because of the fact that it requires exact vertical alignment of the socket and ball members prior to coupling.

Having the foregoing in mind, it is the particular object of my invention to equip a trailer hitch of the type above identified with simply constructed, easily manipulative means for exactly aligning the socket and ball members under backing of the tow car and which, when not in use, may be adjusted into an out-of-the-way fixed position.

To the accomplishment of the above, and subordinate objects presently appearing, a preferred embodiment of my invention, and one modification thereof, have been illustrated in the accompanying drawings, set forth in detail in the succeeding description, and defined in the claims appended hereto.

In said drawings:

Figure 1 is a fragmentary view in top plan illustrating the preferred embodiment of the invention, Figure 2 is a fragmentary view in side elevation, Figure 3 is a view in bottom plan, Figure 4 is a view in side elevation, partly broken away, of the aligning bar and locater hook, Figure 5 is a fragmentary view in transverse section taken on the line 5—5 of Figure 1 looking in the direction of the arrows, Figure 6 is a view in top plan of a modification of the invention, Figure 7 is a view in perspective of the aligning bar of Figure 6, and Figure 8 is a view in transverse section taken on the line 8—8 of Figure 6 looking in the direction indicated by the arrows.

Referring to the drawings by numerals, and first to Figures 1 to 5 illustrating the preferred embodiment of the invention, the numeral 1 designates a draft rigging of the type of trailer hitch with which the invention is concerned and the numeral 2 the ball member for coupling to said draft rigging. The rigging comprises a pair of side bars 3 extending forwardly from the underside of the trailer, represented at 4, in converging relation to a suitably attached plate 5 having upstanding therefrom an inverted socket member 6. The ball member 2 is fixed on top of a link 7, at the rear end thereof, which link is pivoted, as represented at 8, on the tow car, not shown, to extend rearwardly of said car and for lateral swinging movement to align the ball vertically beneath the socket member 6.

According to my invention, the described draft rigging 1 is equipped with a pair of front and rear transversely extending bars 9, 10, bolted at their ends as at 11, to the undersides of the bars 3 in parallel relation and at suitable points in the rear of the plate 5.

Pivotally mounted adjacent one of its ends, as at 12, on the front bar 9, beneath the draft rigging 1 and in the longitudinal center of the latter, is an aligning bar 13 adapted to be swung laterally into effective and ineffective idle, positions respectively. In the effective position thereof said bar 13 extends forwardly beyond the plate 5 a substantial distance and to one side of the socket member 6 so that under backing of the tow vehicle, the ball member 2 will engage the inner edge of the bar 13 and be guided thereby into proper position beneath the socket member 6, it being understood that the draft rigging 1 is elevated to the proper level and the tow vehicle is backed in the proper direction. The other end of the bar 13, in the effective position thereof, is located beneath the rear bar 10 and means are provided for locking said other end to said bar to retain the bar 13 in effective position. The retaining means comprises a pin 14 designed to be inserted through suitable apertures 16, 17 in said bars 10 and 13 respectively. In the ineffective position of the bar 13 it is substantially reversed, as shown by dotted lines in Figure 1, so that it extends beneath the chassis 18 of the trailer 4. Means are provided for retaining the bar 13 in ineffective position comprising a right-angled clip 19 vertically slidable in a suitably fixed bracket 20 and tensioned by a spring 21 for coaction with the underside of the chassis to grip the bar 13 therebetween.

The aligning bar 13 is equipped with a flat bar-like locater grab hook 21 pivotally mounted intermediate its ends, as at 18, on said bar for edgewise swinging movement horizontally to adjust the same, in the effective position of said bar 13, into and out of locating positions. In its locating position, the loop of the hook 21 opens forwardly, extends laterally from the bar 13, and is vertically aligned with the socket member 6, so as to catch and surround the ball member 2 and hold the same in vertically aligned position relative to the socket member 6. A pin 22 is provided for extension through suitable apertures 23, 24 in said hook 21 and bar 13, respectively, to hold the hook in locating position, said pin being removable as will be understood. A chain 25 anchors the pin 22 to the bar 13. The pivot 15 of the hook 21 has the form of a bolt which may be removed so that the hook 21 may be reversed on the bar 13 and said bar extended on the other side of the socket member 6 with the hook 21 in proper position and as shown in dotted lines in Figure 1. The purpose of positioning the bar 13 on said other side of the socket member 6 is to provide for its use when the tow vehicle is backed in a different direction as will be understood. A second pin-receiving aperture 26 is provided in the bar 10 for the pin 14 to retain the bar 13 in this last described position.

In the modified form of the invention shown in Figures 6, 7 and 8, the draft rigging 1a is of a type from which the socket member is eliminated and a recessed forwardly opening plate 27 is substituted in lieu of the socket member. In connection with this type of draft rigging, an aligning bar 28, similar to the bar 13, is utilized in the same manner as bar 13. The draft rigging 1a, in this instance, is provided with front and rear pairs of upper and lower transverse bars 29, 30. The bar 28 is pivoted, as at 31, to the lower front bar 29. A pin 32, similar to pin 14, is used to retain the bar 28 in effective position but is extended through the rear pair of bars 30 as shown in Figure 8 and into an aperture 33 in the bar 28.

Referring now to the use of the preferred embodiment of the invention, prior to backing the tow vehicle, the draft rigging 1 is elevated to the proper position, the aligning bar 13 is swung into the described effective position, and fixed therein by means of the retaining pin 14 in the manner already described. The tow vehicle is then backed to engage the ball member 2 with the aligning bar 13 and then further backed until said ball member is caught by the grab hook 21. The draft rigging 1 is then lowered to enter the ball member 2 in the socket member 6. The pin 22 is removed, prior to uncoupling the hitch, and the grab hook 21 swung on its pivot out of locating position. This may be also done prior to swinging the bar 13 to ineffective position as will be understood.

The use of the bar 28 in the modified form of the invention will be readily understood from the described use of the bar 13.

The foregoing will, it is believed, suffice to impart a clear understanding of my invention without further explanation.

Manifestly the invention, as described, is susceptible of modification in other respects than as disclosed and right is herein reserved to such other modifications as fall within the scope of the subjoined claims.

What I claim is:

1. In a trailer hitch for coupling a tow car to a trailer, a draft rigging for the trailer comprising a frame adapted to extend forwardly therefrom and having a socket member on the front end thereof, a ball member adapted for attachment to the tow car to be backed thereby into vertically aligned coupling relation to said socket member and to swing laterally to facilitate aligning the same, and means to align said ball member under backing of the same comprising an aligning bar pivotally mounted on said frame for swinging movement into and from forwardly extending relation to said frame and to either side of said socket member selectively.

2. In a trailer hitch for coupling a tow car to a trailer, a draft rigging for the trailer comprising a frame adapted to extend forwardly therefrom and having a socket member on the front end thereof, a ball member adapted for attachment to the tow car to be backed thereby into vertically aligned coupling relation to said socket member and to swing laterally to facilitate aligning the same, and means to align said ball member under backing of the same comprising an aligning bar pivotally mounted on said frame for swinging movement into and from forwardly extending relation to said frame and to either side of said socket member selectively, and means to couple said bar to said frame at will against movement from such relation.

3. In a trailer hitch for coupling a tow car to a trailer, a draft rigging for the trailer comprising a frame adapted to extend forwardly therefrom and having a socket member on the front end thereof, a ball member adapted for attachment to the tow car to be backed thereby into vertically aligned coupling relation to said socket member and to swing laterally to facilitate aligning the same, and means to align said ball member under backing of the same comprising an aligning bar pivotally mounted on said frame for swinging movement into and from forwardly extending relation to said frame and to either side of said socket member selectively, and means to couple said bar to said frame at will against movement from such relation, and means to releasably lock said bar against swinging into said relation.

4. In a trailer hitch for coupling a tow car to a trailer, a draft rigging for the trailer comprising a frame adapted to extend forwardly therefrom and having a socket member on the front end thereof, a ball member adapted for attachment to the tow car to be backed thereby into vertically aligned coupling relation to said socket member and to swing laterally to facilitate aligning the same, and means to align said ball member under backing of the same comprising an aligning bar pivotally mounted on said frame for swinging movement into and from forwardly extending relation to said frame and to either side of said socket member selectively, and means to couple said bar to said frame at will against movement from such relation, and a locater hook on said bar vertically aligned with said socket member in said relation of said bar and opening forwardly to receive said ball member therein.

5. In a trailer hitch for coupling a tow car to a trailer, a draft rigging for the trailer comprising a frame adapted to extend forwardly therefrom and having a socket member on the front end thereof, a ball member adapted for attachment to the tow car to be backed thereby into vertically aligned coupling relation to said socket member and to swing laterally to facilitate aligning the same, and means to align said ball member under backing of the same comprising an aligning bar pivotally mounted on said frame for swinging movement into and from forwardly extending relation to said frame and to either side of said socket member selectively, and means to couple said bar to said frame at will against movement from such relation, and a locater hook on said bar vertically aligned with said socket member in said relation of said bar and opening forwardly to receive said ball member therein, said locater hook being swingable on said bar out of alignment with said socket member.

HENRY HOWARD REYNOLDS.